May 28, 1946.  A. PI SUNER  2,401,271
METHOD AND APPARATUS FOR PROJECTING PICTURES IN RELIEF
Filed June 6, 1942  2 Sheets-Sheet 1
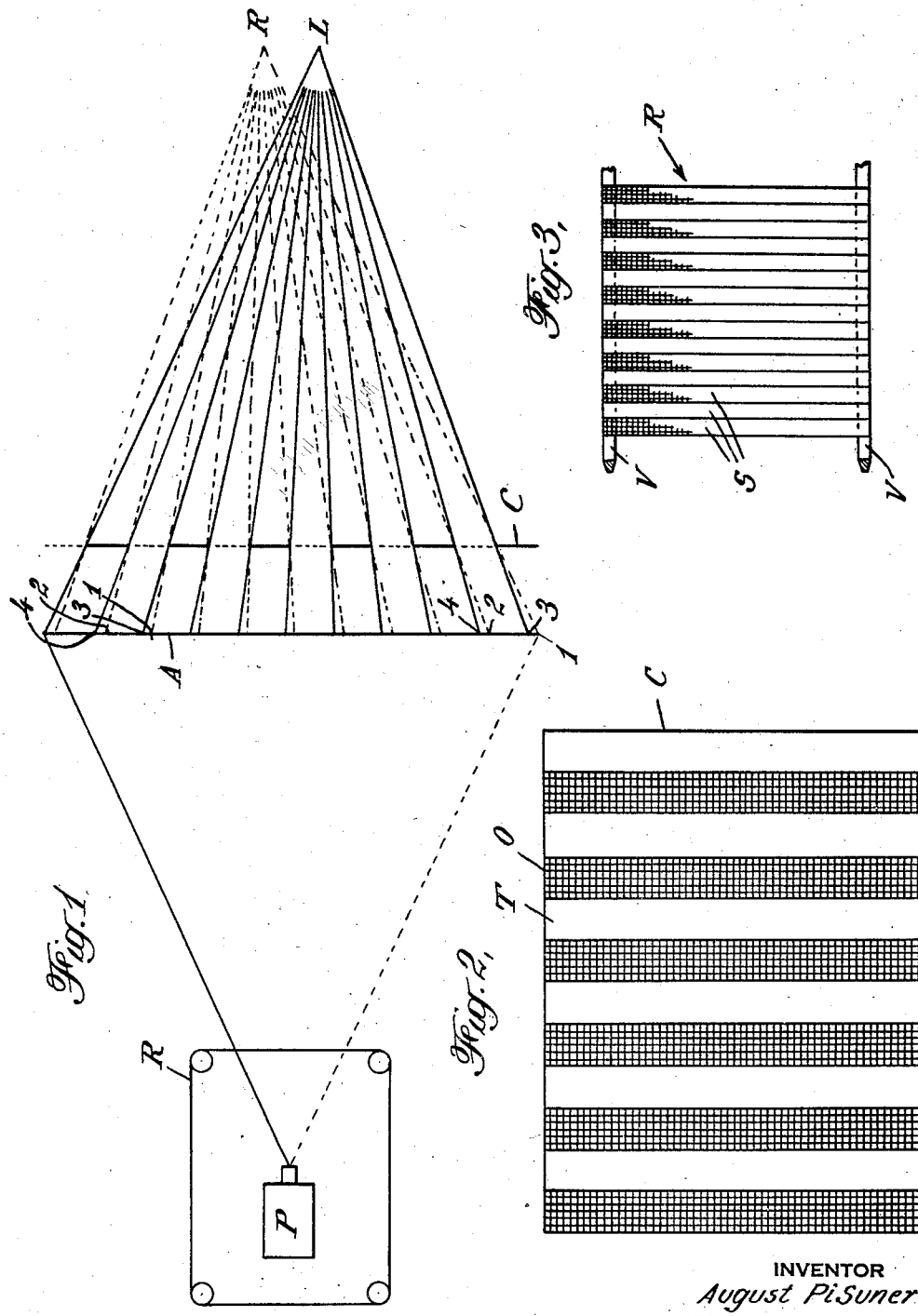
INVENTOR
August Pi Suner
BY
Pennie Davis Marvin & Edmonds
ATTORNEYS

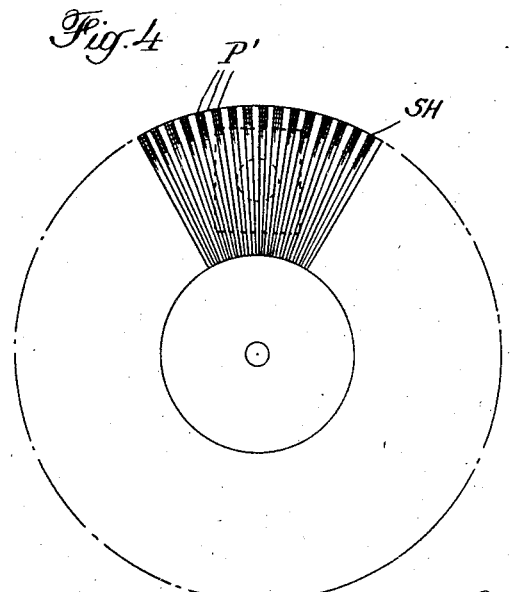
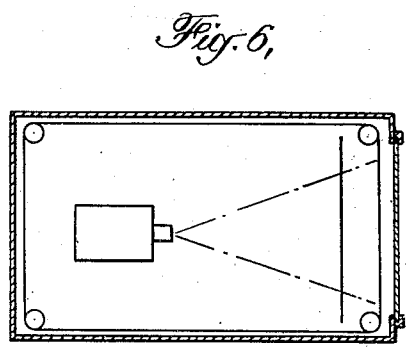
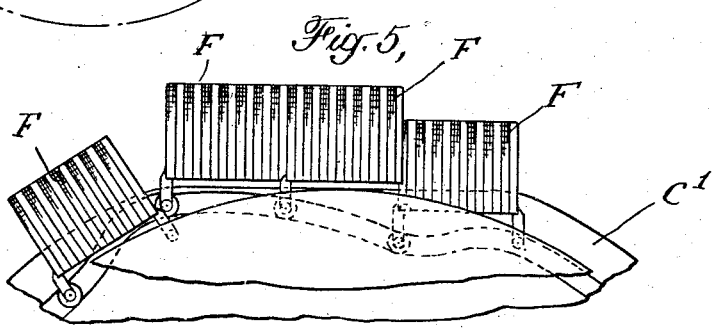
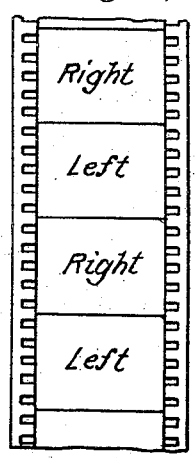
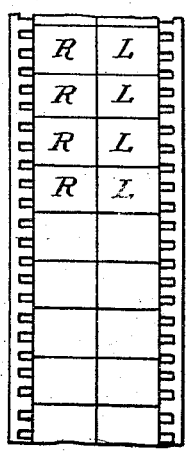
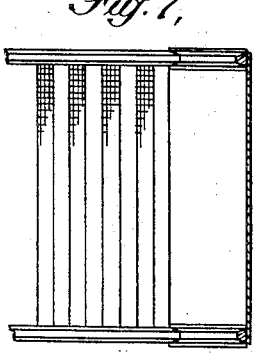

Patented May 28, 1946

2,401,271

UNITED STATES PATENT OFFICE 2,401,271

METHOD AND APPARATUS FOR PROJECTING PICTURES IN RELIEF

August Pi Suner, Caracas, Venezuela

Application June 6, 1942, Serial No. 446,126

5 Claims. (Cl. 88—16.6)

The illusion of relief in pictures is created by different artificial methods. The best known consists in repeating the conditions of binocular vision, for which the stereoscope is generally used. In this apparatus, by means of prismatic lenses, the corresponding photographic images are superimposed one for the right eye and one for the left eye, and, as in the case of natural binocular vision, the illusion of depth or location of the objects in the third dimension is thereby created.

The principle of stereoscopy has been applied, with various degrees of success, in attempting to obtain motion pictures in relief, and while different methods have been employed to obtain the effect of relief in motion pictures they are all based on the properties of binocular stereoscopic vision.

A method widely used is to print two positives—one for the right eye and one for the left eye—on the same film, giving one of them a red color and the other one a green color. The images projected are seen through colored filters—red and green—in the shape of spectacles, so that each eye can only see the image corresponding to it. The method has been modified and improved by using instead of different colors for each image, polarized light of a different axis and utilizing selective spectacles, also polarizing, which allow each eye to see only the corresponding image.

In these applications of stereoscopy to practice, each eye sees a single complete image different from the image seen by the other eye, two differing images are super-imposed, fused in the perception, just as it happens in natural binocular vision, and the result is an effect of relief.

However, this is not the only means of obtaining the perception of depth in motion pictures. When a succession of pictures are taken with an ordinary motion picture camera from a point which moves parallel with the background and projected in the usual manner and viewed with the naked eye, without any kind of artifice or contrivance, there is produced a clear impression of relief.

The same result is achieved by causing the objects to be photographed to revolve slowly in front of the camera. The psycho-physiological mechanism of perception of relief in the projection is the same as before; displacement of different relative speeds as to the distance in reality of the different points which constitute the image. Both methods are in theory applicable to motion pictures but for obvious reasons are not practical except in very limited fields. However, these methods demonstrate that the perception of relief may be obtained by methods other than stereoscopic vision.

I have discovered a new method by which the impression of depth can be obtained without stereoscopic vision. My new method does not involve relative movement, during the taking of the picture, of the camera and the scene photographed and is readily applicable to all types of motion picture subjects.

In carrying out my new method two images are projected on the screen—one corresponding to the right eye and the other to the left—making them coincide as nearly as possible on the screen; or the superposing of such images may be obtained—thanks to the persistence of the impressions on the retina—by alternating images of the right and left eyes from the same film.

The pictures may be taken with a stereoscopic motion picture camera such as used for taking pictures used in producing the illusion of depth when viewed through "spectacles" by the methods above mentioned. According to the method herein described the pictures are ordinary black-and-white pictures and they are projected directly on the screen without the interposition of different colored filters or polarizing screens or other means of separation. Such pictures, when viewed directly with both eyes viewing the entire screen area at the same time, have no illusion of depth. Instead the picture has the appearance of a double exposure with the parts which are in focus substantially superposed but with the images and objects in the background more or less out of registry.

I have discovered, however, that an illusion of depth may be obtained by viewing the combined images through a device interposed between the spectators and the screen which produces what I call a "differential fragmentation" of the picture during the projection. This differential fragmentation results from interposing between the spectators and the screen some means for causing a series of opaque stripes with intermediate transparent stripes to travel continuously from one side to the other across the face of the screen. Various mechanism may be used for this purpose which will be later described, but however produced, the effect of these opaque stripes, which are caused to travel at a speed high enough for the persistence of vision to render them invisible, is to divide the picture into illuminated and dark areas such that at any instant the illuminated portions of the picture seen by one eye do not exactly coincide with the illuminated areas seen by the other eye. That is to say, the middle portion of the illuminated stripes visible to the left eye will be also seen by the right eye, but along the right hand portion of the stripes seen by the left eye there will be an illuminated portion which is opaque at that instant in the corresponding illuminated stripe seen by the right eye, and likewise there will be an illuminated margin along the left hand edge of the stripe visible to the right eye which is opaque to the left eye. These illuminated stripes are constantly changing, but always at any given instant the stripes seen by one eye will have the described relation to the stripes seen by the other eye. I have discovered that this differential fragmentation produces in the projected picture an illusion of depth which is not explainable on the principles of stereoscopy, but which is nevertheless definite and pronounced.

In the accompanying drawings,

Fig. 1 is a diagrammatic view showing one arrangement of apparatus for producing the differential fragmentation in a projected picture;

Fig. 2 shows diagrammatically the lighted and dark areas of the screen at any given instant and the relation of the images seen, respectively, with the right eye and the left eye at any given instant;

Fig. 3 is a detail view of the traveling screen employed in the apparatus illustrated in Fig. 2;

Fig. 4 is a diagrammatic view showing another type of device with which the differential fragmentation may be produced;

Fig. 5 is a detail view of a modified form of the device shown in Fig. 4;

Fig. 6 is a diagrammatic view showing a third method of producing the differential fragmentation;

Fig. 7 is a detail view of a portion of the device shown in Fig. 6; and

Figs. 8 and 9 show the two different types of film which may be employed in producing the pictures.

Referring to Fig. 1, A illustrates the screen upon which the right and left pictures of the stereoscopic couple are simultaneously projected from the rear of the screen, that is, the side away from the spectators, by the projector illustrated at B. L and R illustrate the positions of the left and right eyes of a spectator in an auditorium. C indicates the opaque stripe-producing screen which may be of the character hereinafter described which is interposed between the projection screen and the spectators at a substantial distance in front of the projection screen. For example, the projection screen may be at the plane of the back-drop of a theatrical stage with the stripe-producing screen at a distance about half way the depth of the stage. The exact distance is not important, but the stripe-producing screen should preferably be closer to the projection screen than to the nearest spectators.

In the drawings I have illustrated the stripe-producing screen as having at a given instant of operation opaque portions O with intermediate transparent portions T. At any given instant the picture seen by the right eye will be made up of vertical illuminated stripes extending from 1 to 2 as indicated in Fig. 1, while the picture seen by the left eye will be composed of vertical illuminated stripes extending from 3 to 4. Thus at any given instant the portions of the illuminated stripe making up the picture which are seen by the right eye will consist of the left-hand marginal portions extending from 1 to 3 which are seen by the right eye alone, and the right-hand portions extending from 3 to 2 which are seen also at the same instant by the left eye. Similarly, the picture seen by the left eye is composed of the portions 3 to 2 which are also part of the right-hand picture, and the marginal portions 2 to 4 which are seen only by the left eye.

In Fig. 1 I have greatly exaggerated the distance between the eyes in relation to the distance of the spectator from the screen in order that the marginal portions may be distinct in the drawings. In practice the opaque stripes are much narrower than indicated with respect to the distance of the screen from the spectator. For example, the opaque stripes may be about two and one-half or three inches wide with intervening transparent portions of like width. For a spectator seated at the distance indicated in Fig. 1 from the screen C and with that screen arranged in front of the projection screen A at the distance shown, the relative widths of the common portions of the illuminated stripes and the individual left and right portions will have about the relative widths indicated in Fig. 1.

The speed of movement of the opaque stripes across the face of the screen is not critical, but should be fast enough for the stripes not to be individually distinguishable. Also, the speed of movement should be out of tune with the movement of the shutter of the projector so that there will be no variation in the total illumination of the different portions of the screen.

I will now describe the structural features of the apparatus disclosed in Figs. 1, 2 and 3. As here shown, P indicates the projector which is placed back of the projection screen A. The projector may be an ordinary projector such as used in conventional motion pictures, in which case the film employed will be of the type illustrated in Fig. 8 with the right and left pictures arranged alternately on the film. Intercepting the cone of light from the projection lens is a continuous band or ribbon R composed of spaced polaroid strips S with the spaces between transparent. As shown in Fig. 3, the band or ribbon may be composed of marginal driving belts V with individual strips of polaroid attached at opposite ends to the belts. The band or ribbon completely surrounds the projection apparatus and its lamp so as to intercept the light rays between the projection lens and the screen A.

In front of the projection screen at the distance desired for producing the traveling opaque stripes is the screen C composed of a sheet of polaroid with its polarizing axis arranged opposite to the axis of the polaroid strips forming part of the ribbon R. This sheet of polaroid transmits the light through the transparent spaces of the ribbon R but does not transmit the light passing through the polaroid strips of the ribbon R and consequently as a result of the continuous movement of the ribbon R, which as stated above is driven at a speed fast enough for the opaque stripes not to be individually discernible, there will be a continuous procession of opaque stripes moving horizontally across the entire area of the polaroid sheet, although there will actually be no moving parts in front of the projection screen.

In Fig. 4 I have shown another arrangement for producing the opaque stripes by optical means. As here shown, the polaroid strips, instead of being attached to a continuously traveling belt, may be made up into a rotating shutter SH mounted beneath the projector in a position to intercept the light from the projection lens close to the lens. The strips of polaroid P¹ are sector-shaped as shown, but by making the shutter fairly large with respect to the diameter of the cone of light at the plane of the intersection by the shutter the angular movement during the passage through the light will be insignificant.

If desired the strips of polaroid may be mounted on frames F individually pivoted on the shutter as shown in Fig. 5, and turned on their individual pivots by a suitable cam C¹ during their passage across the light to maintain the polaroid strips in vertical position.

The same optical effect may be produced by purely mechanical means, as shown, for example, in Fig. 6. As here shown an endless belt made up of alternate opaque and transparent strips extending transversely of the belt is interposed between the screen and the spectator to mechanically intercept the light between the screen and the spectator in the manner described. Such an apparatus would be cumbersome and expensive for use in theatres, but is well adapted for amateur use where there are but few spectators, and is particularly adapted for the coin-in-the slot projector machines where the projector and screen are enclosed in a cabinet and viewed by a single spectator at a time.

I am unable to fully explain why the differential fragmentation of pictures in the manner above described produces the illusion of depth.

The perception of relief is the result, as in all perceptions, of psycho-physiological processes of great complexity. The binocular vision and its application to the classical stereoscopy, among others, fill one of the conditions. But other circumstances are factors in the impression of depth, such as: sensations self-perceptive of convergence—the increasing convergence of the axes on which two luminous points, which the individual makes an effort to superimpose in space, meet, causes the illusion of approximation of the point in which the two have fused upon being superimposed; sensation of adjustment—the nearer the individual finds himself to a given object, the stronger will be the effort of adjustment of the eyes. Also the relative lateral displacement of the objects at various distances from the individual and in relation with these distances or the vision more or less clear in accordance with the distance, the size, the color of the objects depending on whether they are more or less near, etc. Numerous factors intervene in the intuitive process which places the objects in the third dimension. By collecting and co-ordinating, organizing, these different elements, the conscience perceives the depth and this perception translates itself into a specific impression of space—a "supersensation" which cannot be defined, as no sensation can be defined, but is characteristic and impossible to confuse.

The objects stand in space in three dimensions, therefore more or less removed from ourselves. The sensorial expression of the intuitive knowledge of this distance is the impression of relief, indefinable but well perceived. The depth is objective, it is in space; the impression of relief is subjective, it is within ourselves. Already in 1870 Brewster had called attention to the fact "that it is not the stereoscope which gives the relief, as most people believe. The apparatus does nothing but take the place of the muscular activity of the eyes, which in natural vision superposes the two figures." Parinaud, in 1898, repeated that "the perception of relief does not result from a physical theory, but is the result of physiological processes."

Making use of various sensorial elements, the individual gives to them appropriate form, including them in a system from which the concept will result and, as a consequence, the impression of depth.

The use of the film shown in Fig. 8, that is, a film having the right- and left-hand pictures alternately spaced on the film, has the advantage that the ordinary commercial motion picture projector may be employed. In the projection of any motion picture the speed of operation of the projection machine is to be co-related with the speed at which the pictures are taken, and it is therefore desirable to increase the speed of the projector so that the same number of successively taken pictures are projected in the same interval of time as with the usual film. Projectors with driving mechanism for operating at increased speed are already available for use with film having differently colored right and left pictures in a single series. Such projectors are also used for color pictures produced from films having successive prints of the same exposure in different colors in a single row on the film.

Instead, however, of using the film of Fig. 8, the same results may be accomplished by using a film having stereoscopic pictures arranged in pairs, as shown in Fig. 9. With film of this character the pictures are simultaneously projected and superimposed by suitable arrangement of prisms.

In the appended claims the expression "simultaneously producing right- and left-projected pictures" is intended to include simultaneous production by simultaneous projection or by persistence of vision from alternate projection.

The differential fragmentation of the picture may be optically produced by employing instead of the polaroid screen, colored glass or other transparent material and using with it instead of the polaroid strips on the traveling band or shutter, strips of light filter material colored to absorb the light which is transmitted by the colored screen. This method would not be so satisfactory as the method employing the polaroid screen for the resulting picture will appear in a single color instead of black-and-white. Also, the amount of light lost by absorption would be considerably greater with the polaroid screens.

It will be understood that my invention is in nowise limited to the particular mechanisms above described for producing the effect which I have designated as differential fragmentation. Other apparatus and methods may no doubt be devised for producing that effect. My invention consists primarily in the discovery that such differential fragmentation produces the illusion of depth in projected pictures.

My invention may obviously apply to still pictures as well as motion pictures, as the movement of the interference screen is in nowise related to the movement of the pictures except that it must be out of tune with the shutter of the projection machine in order to avoid uneven lighting of the screen.

I claim:

1. The method of producing an illusion of depth in projected pictures which consists in simultaneously producing on a screen by projection complete images of right- and left-pictures and interposing between the projected pictures and the spectators an interference screen for producing successive light-obstructing sections moving successively from one side to the other of the illuminated area at a rate unrelated to the movement of the film, portions of both said pictures being at any given instant of operation visible to both eyes of the spectator.

2. The process according to claim 1 wherein the light-obstructing sections are in the shape of narrow vertical stripes with alternating light-transmitting stripes.

3. The process according to claim 1 wherein the light-obstructing sections are optically produced in transverse succession across the face of the screen.

4. The method of producing an illusion of depth in projected pictures which consists in simultaneously producing on a screen by projection complete images of right and left pictures and interposing between the projected pictures and the spectators an interference screen for producing successive transversely moving light-obstructing sections in such manner that portions of both pictures are at any given instant of operation visible to both eyes of the spectators the light-obstructing sections being produced by interposing between the projection screen and the spectators a filter of material which is opaque to certain light rays and causing the light of the projected picture to be modified in successive transversely moving areas so as to be obstructed by said screen.

5. The process according to claim 4 wherein the light-obstructing sections are produced by interposing between the projection screen and the spectators a screen of light-polarizing material and causing the light of the projected picture to be polarized in successive transversely moving areas so as to be obstructed by said screen.

AUGUST PI SUNER.